(12) United States Patent
Elchik

(10) Patent No.: US 10,102,772 B2
(45) Date of Patent: *Oct. 16, 2018

(54) LANGUAGE LEARNING EXCHANGE

(71) Applicant: WESPEKE, INC., Pittsburgh, PA (US)

(72) Inventor: Michael E. Elchik, Moon Township, PA (US)

(73) Assignee: WeSpeke, Inc., Pittsburgh, PA (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/270,095

(22) Filed: Sep. 20, 2016

(65) Prior Publication Data

US 2017/0011654 A1 Jan. 12, 2017

Related U.S. Application Data

(63) Continuation of application No. 14/874,987, filed on Oct. 5, 2015, now Pat. No. 9,489,865, which is a
(Continued)

(51) Int. Cl.
*G06F 17/30* (2006.01)
*G09B 19/06* (2006.01)
(Continued)

(52) U.S. Cl.
CPC ....... *G09B 19/06* (2013.01); *G06F 17/30669* (2013.01); *G06F 17/30684* (2013.01);
(Continued)

(58) Field of Classification Search
CPC ......... G06F 17/30867; G06F 17/30669; G06F 17/30943
See application file for complete search history.

(56) References Cited

U.S. PATENT DOCUMENTS

| 7,653,627 B2 | 1/2010 | Li et al. |
| 2001/0020253 A1 | 9/2001 | Arao |

(Continued)

FOREIGN PATENT DOCUMENTS

| KR | 20060103617 A | 10/2006 |
| KR | 20080006578 A | 1/2008 |

(Continued)

OTHER PUBLICATIONS

International Searching Authority, Search Report for International Application PCT/US2011/056034, dated Feb. 23, 2012(EPO), 2 pages.

(Continued)

*Primary Examiner* — Angelica Ruiz
(74) *Attorney, Agent, or Firm* — Fox Rothschild LLP

(57) ABSTRACT

Systems and methods to enable users to communicate via a language learning exchange are provided herein. One aspect includes registering through a computing device one or more users in a user community of an online language learning platform, the one or more users associated with profile information comprising user name, native language, and language of interest elements; accessing language content for use by the one or more users; matching the one or more users with one or more complementary users; and making the language content available to the users via a language learning exchange interface.

20 Claims, 18 Drawing Sheets

Related U.S. Application Data continuation of application No. 13/272,148, filed on Oct. 12, 2011, now Pat. No. 9,177,064.

(60) Provisional application No. 61/404,755, filed on Oct. 12, 2010.

(51) Int. Cl.
| | | |
|---|---|---|
| *G09B 5/06* | (2006.01) | |
| *H04L 29/06* | (2006.01) | |
| *H04L 29/08* | (2006.01) | |
| *G09B 5/12* | (2006.01) | |

(52) U.S. Cl.
CPC .. *G06F 17/30696* (2013.01); *G06F 17/30867* (2013.01); *G09B 5/06* (2013.01); *G09B 5/065* (2013.01); *G09B 5/12* (2013.01); *H04L 65/60* (2013.01); *H04L 67/1053* (2013.01); *H04L 67/306* (2013.01); *H04L 67/02* (2013.01)

(56) References Cited

U.S. PATENT DOCUMENTS

| | | |
|---|---|---|
| 2003/0033287 A1 | 2/2003 | Shanahan et al. |
| 2003/0186208 A1 | 10/2003 | Wen et al. |
| 2008/0098005 A1 | 4/2008 | Goradia |
| 2008/0222308 A1 | 9/2008 | Abhyanker |
| 2008/0254431 A1 | 10/2008 | Woolf et al. |
| 2008/0254438 A1 | 10/2008 | Woolf et al. |
| 2009/0083288 A1 | 3/2009 | LeDain et al. |
| 2009/0144808 A1 | 6/2009 | Dhananjaya |
| 2009/0217196 A1 | 8/2009 | Neff et al. |
| 2009/0317776 A1 | 12/2009 | Keim et al. |
| 2010/0311030 A1 | 12/2010 | He et al. |
| 2011/0027762 A1 | 2/2011 | Keim et al. |
| 2012/0089635 A1 | 4/2012 | Elchik |

FOREIGN PATENT DOCUMENTS

| | | |
|---|---|---|
| KR | 20090030690 | 3/2009 |
| KR | 20090128582 A | 12/2009 |
| WO | 2006044939 A2 | 4/2006 |

OTHER PUBLICATIONS

Richard Harrison and Michael Thomas, "Identity in Online Communities: Social Networking Sites and Language Learning", International Journal of Emerging Technologies & Society, vol. 7, No. 2, 2009, pp. 109-124.

"Livemocha"_Livemocha Online_. Feb. 21, 2007, [http://livemocha.com/]. _Internet Archive_. [http://web.archive.org/web/20100108012749/http://www.livemocha.com/].

Horowitz et al., "The Anatomy of a Large-Scale Social Search Engine", Proceedings of the 19th International Conference on World Wide Web, WWW '10, Apr. 26, 2010, p. 431-440.

Yang Z. et al., "Research and development of web-based virtual online classroom", ScienceDirect, Computers & Education 48 (2007) 171-184.

| User | Preference | Native Language | Language of Interest | Competency | Online | Gender | Country | City | Age Range |
|---|---|---|---|---|---|---|---|---|---|
| User101 | Practicing | German | English | Fluent | Now | M | Germany | Munich | 50-60 |
| User108 | Teaching | German & French | English | Intermediate | 3 hours ago | F | Canada | Toronto | 45-50 |
| User211 | Teaching | German & Swiss German | Italian | Intermediate | Now | F | United States | New York | 25-30 |
| User357 | Practicing | Chinese | French | Intermediate | Now | M | China | Beijing | 30-35 |
| User117 | Teaching / Learning | Russian | English | Beginner | 4 days ago | M | Russia | Moscow | 50-60 |
| User569 | Teaching | German & French | Japanese | Intermediate | 30 minutes ago | F | France | Paris | 30-35 |
| User1089 | Learning | German | Chinese | Fluent | Now | F | Germany | Berlin | 35-40 |

FIG. 7

| Category: Grammar | Categoría: Gramática |
|---|---|
| Topic: English Grammar | Tema: Inglés Gramática |
| Session: English Grammar | Sesión: Inglés Gramática |
| Snippet: Nouns | Fragmento: Sustantivos |
| Hello. | Hola. |
| My name is _____. | Mi nombre es _____. |
| Let's begin. | Vamos a empezar. |
| Nouns denote classes and categories of things in the world, including people, animals, inanimate things, places, events, qualities and states. | Los nombres denotan clases y categorías de las cosas en el mundo, incluyendo a las personas, animales, cosas inanimadas, lugares, eventos, cualidades y estados. |
| People examples: | La gente ejemplos: |
|    Boy |    Niño |
|    Girl |    Chica |
|    Man |    Hombre |
|    Woman |    Mujer |
|    Teacher |    Maestros |
| Places examples: | Lugares ejemplos: |
|    Home |    Inicio |
|    School |    Escuela |
|    Office |    Oficina |
| Things examples: | Las cosas ejemplos: |
|    Music |    Música |
|    Car |    Coches |
|    Clothes |    Ropa |
| Thank you. | Gracias. |
| Good-bye. | Adiós. |

FIG. 10

| | |
|---|---|
| Category: About you, About me | Catégorie: A propos de vous, A propos de moi |
| Topic: Hobbies and Interests | Sujet: Loisirs et intérêts |
| Session: Musical Instruments | Session: Instruments de musique |
| Hello. | Bonjour. |
| My name is ___. | Mon nom est ___. |
| Let's begin. | Commençons. |
| What musical instrument do you play? | Quel instrument de musique jouez-vous? |
| I play the ___. | Je joue le ___. |
| What type of music do you prefer? | Quel genre de musique préférez-vous? |
| I like ___ music. | J'aime la musique ___. |
| Who is your favorite musician? | Qui est votre musicien préféré? |
| My favorite musician is ___. | Mon musicien préféré est ___. |
| Who is your favorite musical group? | Quel est votre groupe de musique préféré? |
| My favorite musical group is ___. | Mon groupe de musique préféré est ___. |
| What type of musical group do you play with? | Quel type de groupe de musique jouez-vous avec? |
| I play with a ___. | Je joue avec un ___. |
| How often do you practice? | Combien de fois avez-vous la pratique? |
| I practice ___ per ___. | Je pratique ___ par ___. |
| Are you a professional? | Vous êtes un professionnel? |
| I am / am not a professional. | Je suis / ne suis pas un professionnel. |
| Thank you. | Je vous remercie. |
| Good-bye. | Au revoir. |

FIG. 11

Category: Business
Topic: Communications
Session: Meetings

Hello.
My name is _____.
Let's begin.
Let's start with introductions.
My name is _____ and I am _____.
The purpose of this meeting is _____.
Our goals for this meeting are _____.
This meeting should be approximately _____ minutes.
The action items from this meeting are _____.
We will meet again _____.
Thank you.
Good-bye.

Kategorie: Business
Thema: Kommunikation
Session: Meetings

Hallo.
Mein Name ist _____.
Lassen Sie uns anfangen.
Beginnen wir mit Einführungen.
Mein Name ist _____ und ich bin _____.
Der Zweck dieser Treffen ist _____.
Unsere Ziele für dieses Treffen sind _____.
Dieses Treffen sollte etwa _____ Minuten.
Die Aktion Begriffe aus diesem Treffen sind _____.
Wir treffen uns wieder _____.
Danke.
Auf Wiedersehen.

FIG. 12

LANGUAGE LEARNING EXCHANGE

RELATED APPLICATIONS AND CLAIM OF PRIORITY

This patent document is a continuation of U.S. patent application Ser. No. 14/874,987 filed Oct. 5, 2015), which in turn is a continuation of U.S. patent application Ser. No. 13/272,148 (now U.S. Pat. No. 9,177,064) filed Oct. 12, 2011, which in turn claims priority to U.S. Provisional Patent Application No. 61/404,755 filed Oct. 12, 2010. The contents of each priority application listed above are fully incorporated by reference into this document.

BACKGROUND

The subject matter presented herein generally relates to Internet-based learning and teaching, and systems and methods therefor.

Teaching methodologies have evolved in parallel with advances in technology, making learning easier and more intuitive. Increased access to educational materials and systems has also elevated demand. For example, systems directed toward learning languages have become increasingly popular. In addition, globalization has expanded the demand for learning foreign languages and cultures. However, despite progress in pedagogical systems and increased demand, maintaining student motivation and engagement remains a key element of learning success.

SUMMARY

In summary, one aspect provides a system comprising: at least one processor; and a memory device operatively connected to the at least one processor; wherein, responsive to execution of program instructions accessible to the at least one processor, the at least one processor is configured to: register one or more users in a user community of a language learning platform, the one or more users associated with profile information comprising user name, native language, and language of interest elements; access language content for use by the one or more users; and match the one or more users with one or more complementary user community users based on the profile information for participation in one or more learning exchanges.

Another aspect provides a method comprising: registering through a computing device one or more users in a user community of an online language learning platform, the one or more users associated with profile information comprising user name, native language, and language of interest elements; accessing language content for use by the one or more users; and matching the one or more users with one or more complementary user community users based on the profile information for participation in one or more learning exchanges.

A further aspect provides a computer program product comprising: a computer readable storage medium having computer readable program code configured, the computer readable program code comprising: computer readable program code configured to register one or more users in a user community of a language learning platform, the one or more users associated with profile information comprising user name, native language, and language of interest elements; computer readable program code configured to access language content for use by the one or more users; and computer readable program code configured to match the one or more users with one or more complementary user community users based on the profile information for participation in one or more learning exchanges.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

FIG. 7 provides an example of community filtering or enhanced matching results according to an embodiment.

FIG. 10 provides example dialogue content according to an embodiment.

FIG. 11 provides another example dialogue content according to an embodiment.

FIG. 12 provides a further example dialogue content according to an embodiment.

DETAILED DESCRIPTION

Figure 1:
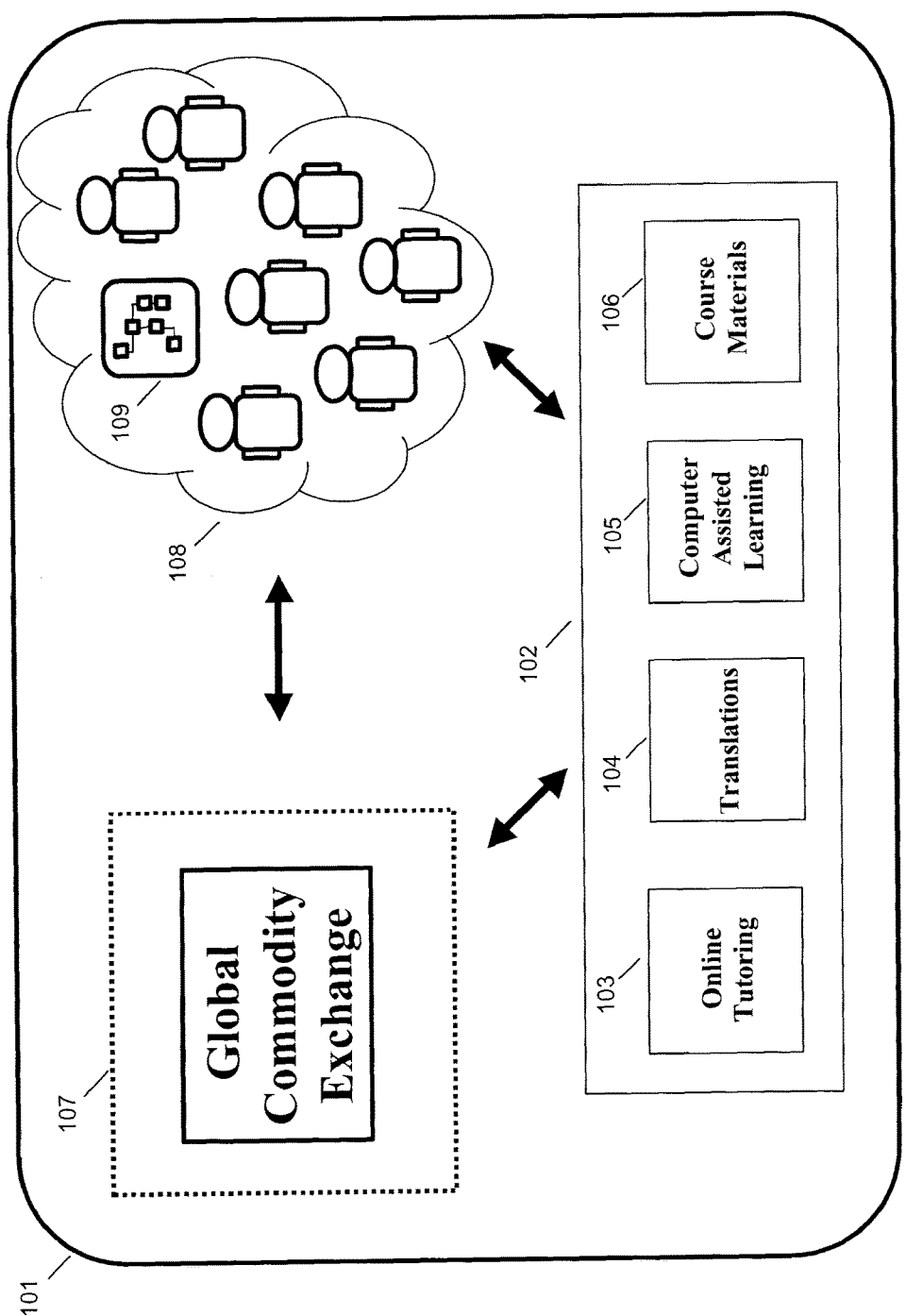
FIG. 1 provides an example language learning platform configured according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

Methods for learning and obtaining new skills have progressed in parallel with advances in technology. There is currently a proliferation of Internet-based colleges, specialized courses, and skill-training sessions aimed at capturing large and diverse audiences. In addition, such online learning applications continually strive to keep pace with innovation, apparently in an effort to appear effective and a step ahead of any competition. However, effectiveness is not measured merely by the technological state of a learning system. Instead, learning system performance is largely contingent on whether the system develops motivated and engaged students who form a relationship with the system and its content, and, ultimately, facilitates a user community driven to learn.

Estimates provide that there may be as many as 2.1 billion Internet users worldwide. In addition, this population of users may belong to one or more social network sites based on geography and membership context. For example, Facebook® and LinkedIn® are prominent social network sites in North America, while Kohtakte is a primary site in Russia and Orkut® is a popular site in certain parts of Asia. Facebook® is a registered trademark of Facebook, Inc. Orkut® is a registered trademark of Google, Inc.

This global division of social network sites loosely follows global language divisions, with each social network comprised of users speaking only a few primary languages prominent in their respective region. The Internet has operated to knock down technological barriers separating individuals from different areas of the world. Nonetheless, billions of Internet users remain disconnected because the major remaining barrier preventing the widespread connection of individuals and social networks is not a technological barrier; to the contrary, it is a language barrier.

The illustrated example embodiments will be best understood by reference to the figures. The following description is intended only by way of example, and simply illustrates certain example embodiments.

Embodiments provide for an Internet-based language learning platform and global cultural exchange designed to allow any user, anywhere on the globe, and at any time, to teach, learn, or practice any language. Referring to FIG. 1, therein is provided an example language learning platform configured according to an embodiment. The language learning platform 101 may be comprised of content 102, which may include, but is not limited to, online tutoring 103, translations 104, such as speech-to-speech translations, computer assisted language learning 105, and language course materials 106 derived from various digital media. A global commodity exchange 107 may be configured to facilitate language and cultural exchanges among language platform users assembled in an online community 108, for example, through membership within the platform 101 or through one or more external social networks 109. An illustrative and non-limiting example provides that language and cultural exchanges may be facilitated through topical content, P2P video and audio, real-time text chat (translated or non-translated), or combinations thereof.

Individuals interested in learning a language may be associated with a native language, one or more secondary languages, and a language they are interested in learning, referred to herein as a "language of interest." In addition, for each language, an individual may demonstrate various levels of proficiency, for example, ranging from advanced to beginner. Embodiments may be configured to facilitate language learning by enabling a speaker of a first language with certain personal characteristics, abilities, and interests to interface with a speaker of a second language with certain personal characteristics, abilities, and interests, wherein the speakers may engage in a mutually beneficial language learning, teaching, or practicing relationship.

According to embodiments, an Internet-based application may be accessible to a community of users, for example, through a web site that is a free and open global commodity exchange, allowing users to connect using peer-to-peer video and voice communications for communicative language teaching, learning, or practicing. Non-limiting examples of language content include words, numbers, phrases, sentences, paragraphs, stories, experiences, online postings, user status updates, video and audio files, digital media content, and combinations thereof. Embodiments provide that language content may be juxtaposed with live video, images, or other forms of visual data arranged to guide users in language learning. In addition, language content may be organized topically (e.g., language basics, travel, food, greetings), packaged in increments of time (15-30, 30-60, and 60+ minutes), and aligned to user interests and demographics, such as what two users of a certain age range may discuss about certain topics (e.g., what two teenagers may discuss about music, fashion, or online video games).

Figure 2:
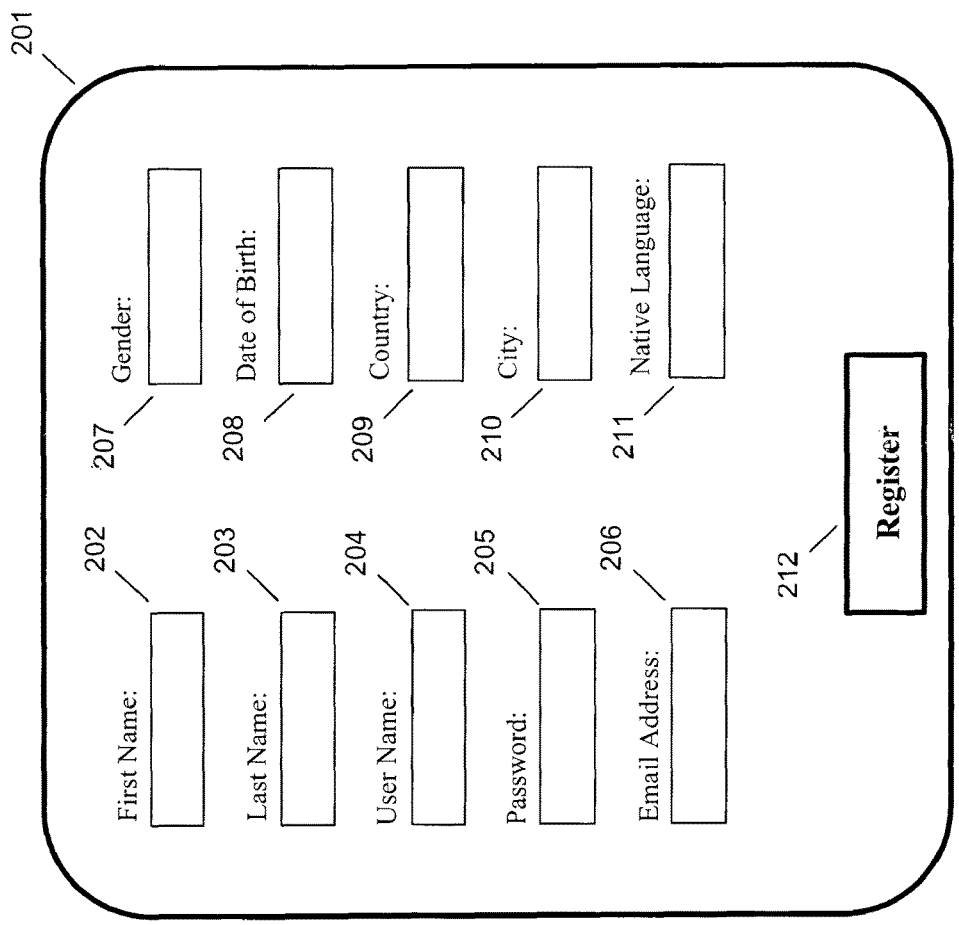
FIG. 2 illustrates an example user registration interface arranged according to an embodiment.

Each potential language learning platform user may access an interface to register with the platform and become a member of the platform user community (i.e., user network or platform social network). The registration interface may be configured to present a user with components for entering information that represents the minimum amount of information required to register with the platform and create a user profile. FIG. 2 illustrates an example user registration interface arranged according to an embodiment. As shown in FIG. 2, certain profile information is presented to a user through a registration interface 201, including, but not limited to, first name 202, last name 203, user name 204, password 205, email address 206, gender 207, date of birth 208, country 209, city 210, and native language 211. After the profile information has been entered, a user may register with the platform through selection of a registration function 212. Platform registration creates a user account comprised of a set of user profile information, which may include at least the profile information depicted in FIG. 2.

In addition, embodiments provide that users may register by using an external social network account. For example, the platform or the external social network account may provide a function for interacting with each other. An illustrative and non-limiting example provides that the platform may provide for selection of an external social network or an external social network may provide for selection of the platform, wherein selection prompts the user to log into the external social network using their external social network login credentials. In this example, after the user logs into the external social network, the platform may obtain profile information from the user's external social network profile for populating the platform profile elements, such as those provided in FIGS. 2, 3, and 5, discussed below. In addition to registering with the platform using an external social network site, users may affiliate one or more external social network sites with their user account. Embodiments provide that the platform may use the external social network affiliations to obtain user connection or profile information and users may use the external social networks to connect to users on the same or different external social networks through the platform. For example, if a user registers using an external social network profile or affiliates their profile with one or more external social networks, the platform may use the external social network profile information to populate platform profile elements. In addition, embodiments provide that each time that the user logs into the platform, the platform may be configured to access the profile information associated with the affiliated external social networks to determine if profile information on the platform can be updated based on changes in the external social network profile information.

A non-limiting example provides that if a user affiliates a social network site with the platform and changes the city profile element (e.g., from New York to Chicago) in their external social network profile, when they log into the platform, the platform may automatically update the city profile element in their platform profile or in response to an affirmative user prompt. Exemplary external social network sites include Facebook® and LinkedIn®.

Platform registration information, such as that provided in FIG. 2, may be used by the platform and the user community for various reasons. For example, city and country information may be used to indicate specific dialects of a language that are likely to be spoken by a specific user. In addition, city and country information may be used by users to connect with others located in a destination where they may be traveling in the near future, for example, so that they may have a contact in their destination city.

In addition, certain profile information may be used or not used based on certain cultural or security reasons. For example, certain cultures or individuals may have sensitivities regarding specific profile information elements, such as gender or age. As discussed below in the disclosure related to FIG. 5, users may also specify characteristics that they may not want in a learning exchange partner, which may be referred to herein as "restricted" characteristics or "exchange restrictions." A non-limiting example provides that if a second user having one of the restricted characteristics makes an exchange request directed toward a first user, the request may be communicated to the first user with a statement that a user has made an exchange request but has a restricted characteristic. According to one embodiment, the first user may elect to override the restriction and accept the request. Certain embodiments provide that the request may be denied automatically, may be denied responsive to a user prompt, or the user profile may have a setting wherein the user may select whether they want automatic denial or to be prompted as to whether they would like to accept or deny. In the situation of a request involving a restricted characteristic that is denied, the requesting user (e.g., the second user, above) is notified of the denial and may receive a generic statement, for example, that the user is not accepting any requests at this time. In this way, the requesting user may not be notified that they were specifically denied for one or more particular reasons.

Figure 3:
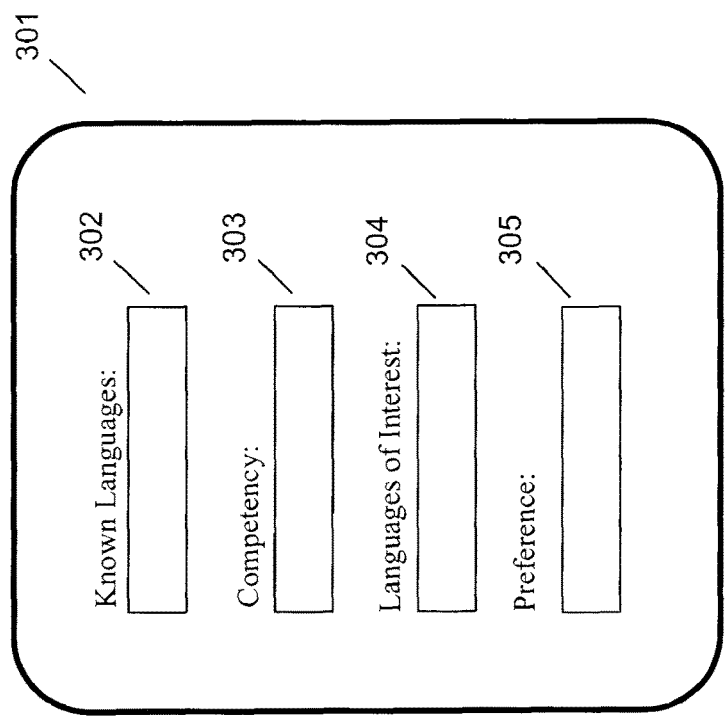
FIG. 3 provides an example language profile interface arranged according to an embodiment.

Platform users may access additional profile information interfaces, including, but not limited to, language profile, topic, and profile detail interfaces. Referring to FIG. 3, therein is provided an example language profile interface arranged according to an embodiment. The language profile interface 301 provides a user with the ability to enter language information, including known languages 302 and associated competencies 303, languages of interest 303, and student or teacher preferences 304, which may be configured to indicate whether, for a particular language or in general, a user prefers to teach, learn, or both.

Figure 4:
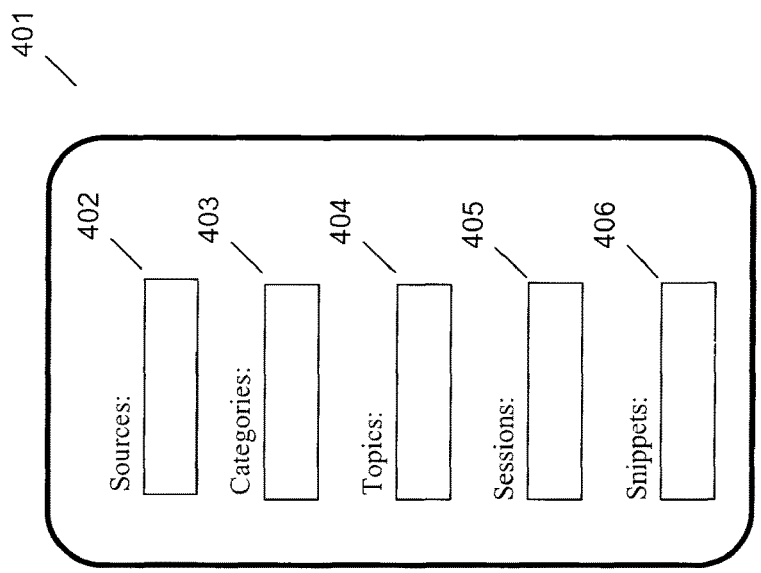
FIG. 4 provides an example topic profile interface configured according to an embodiment.

In FIG. 4, therein is provided an example topic profile interface configured according to an embodiment. The topic profile interface 401 provides user access to topic information settings relevant to learning exchanges arranged through the platform. As shown in FIG. 4, non-limiting examples of topic profile information include sources 402, categories 403, topics 404, sessions 405, and snippets 406. According to embodiments, sources 402 may represent content sources, including, but not limited to videos, (online) books, images, dictionaries, user-created content, and combinations thereof. As such, platform users may select which type of content source they would like to interact with, as certain users at certain times may prefer to interact with a video while certain other users may prefer to interact with text-based content, such as a digital book.

A non-limiting example provides that a first user and a second user may each want to learn language skills pertaining to travel, and greetings and introductions in particular. The first user may use a video directed toward the category of travel and the topic of greetings and introductions, while the second user may access a digital book directed toward the category of travel and the topic of greetings and introductions. Embodiments provide that the topic profile information pertains to, inter alia, the level of information being accessed by a user. For example, if a source is a book, then the category may be the table of contents, the topic may be a chapter, the session may be a page, and the snippet may be a particular paragraph or sentence.

Figure 5:
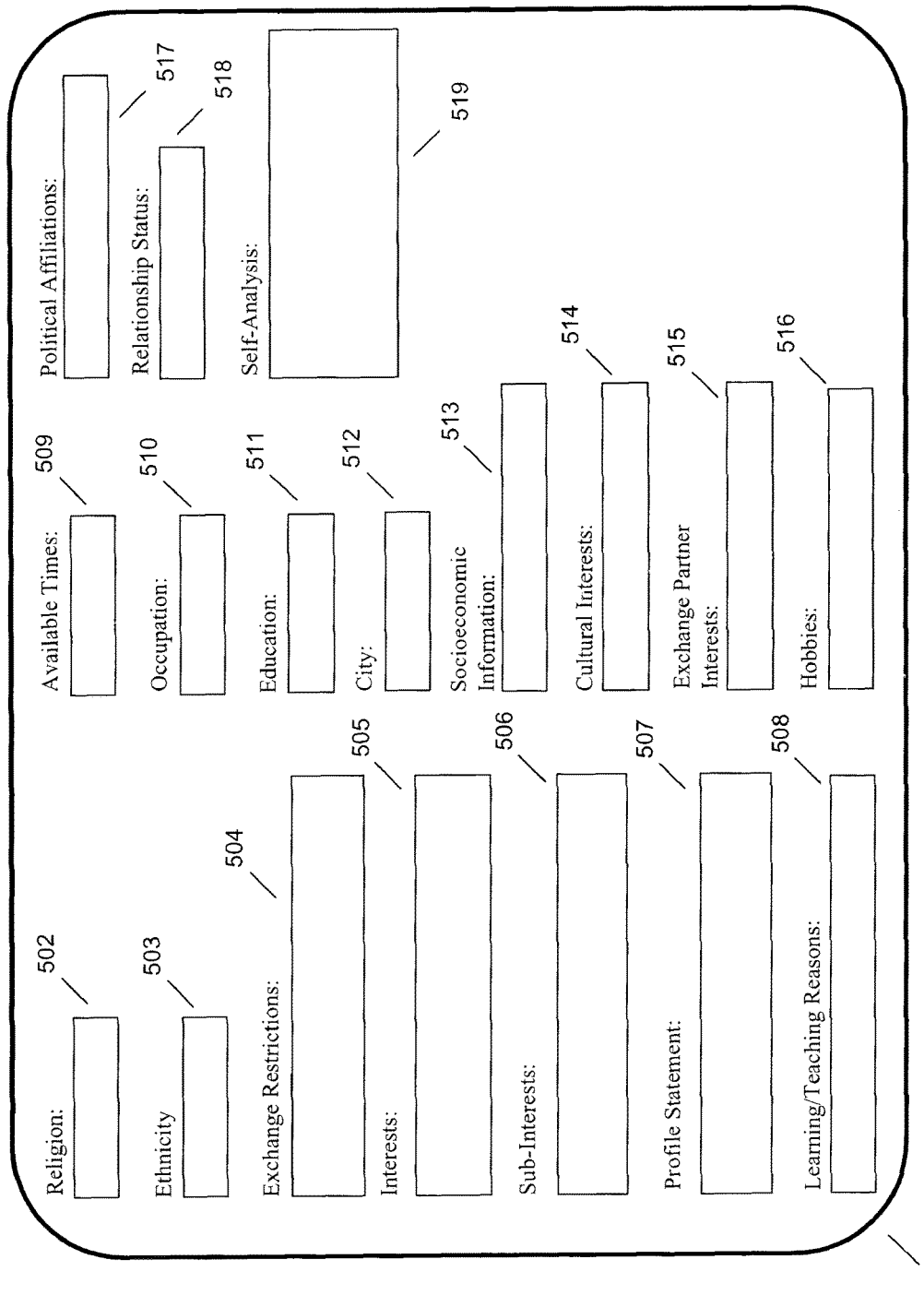
FIG. 5 provides a detailed profile information interface configured according to an embodiment FIG. 6 provides an example community filtering process configured according to an embodiment.

FIG. 5 provides a detailed profile information interface for providing user access to detailed profile information according to an embodiment. The detailed profile information interface 501 provides elements for entering or selecting additional profile information that allows platform users to create more personalized and intricate platform user profiles. In addition, the additional information allows the platform to conduct more accurate and enhanced exchange matches. According to embodiments, the detailed profile information may be voluntary information, such that a user may utilize all platform functions without specifying any or all of the detailed profile information. Illustrative and non-restrictive examples of detailed profile information include religion 502, ethnicity 503, exchange restrictions 504, interests 505 and sub-interests 506, profile statement 507, one or more reasons for learning or teaching a particular language 508, available times 509, occupation 510, educational background information 511, city 512, socioeconomic information 513, cultural interests 514, exchange partner interest information 515, hobbies 516, political affiliations 517, relationship status 518, and self analysis information 519 (e.g., I see myself as intelligent, confident, and/or funny). Embodiments provide that the more detailed information that a user has in his profile, the more accurate and effective platform functions, such as matching users for learning exchanges, may become.

The exchange restrictions 504 information may be directed toward characteristics that a user does not want in an exchange partner. For example, certain users may only want to be matched with users of a certain gender, age range, or country. Interest 505 information may pertain to any interests that a user deems important, such as interests that a user may want to use as a point of discussion during a platform learning exchange, while the sub-interest 506 information may operate to provide more detail regarding an interest 505. For example, a user interest 505 may be soccer, while a sub-interest 506 may be the specific soccer league or coaching a soccer team. In another example, a user interest 505 may be photography, while a sub-interest 506 may be wildlife photography or running a photography studio. Interest categories may be broad and may not produce matches adequately related, while sub-topics allow for more accurate matches and, as a result, potentially more engaging dialogue between matched platform users. The exchange partner interest information 515 may provide information regarding characteristics a user would like in an exchange partner, such as age range, political affiliations, or educational level. The profile statement 507 element may be comprised of a free-form text-based description provided by the user, for example, providing more detailed or additional information that may not be communicated using the other user profile elements.

The available times 509 element may be comprised of one or more tools for providing information pertaining to times that a user may be able to interact with the platform, such as participating in a learning exchange. Non-limiting examples provide that this information may be entered by the user in a text-based or calendar based format, or may be inferred by the platform based on, inter alia, the expected time zone and daily pattern of the user based user profile information, including country and city information. Embodiments provide processes for taking the available times profile element into account when searching or filtering for users and when scheduling learning exchanges between users. For example, when performing community browsing, community filtering, or enhanced matching functions, the platform may only present users currently online or those having a corresponding schedule (e.g., same time zone or same pattern of availability). In addition, embodiments may present users ranked or sorted based on availability. As such, users may decide whether they would prefer a user who is currently offline or who has an availability different from the availability specified in their profile, or whether they would prefer someone who is currently online and able to participate in a learning exchange.

In a first non-limiting example, the platform may only present users or may rank users based on whether the users are currently online, are in a particular user's time zone, or have an available times profile that corresponds with a particular user's available times profile. As such, users may locate and interact with other users in real time because they are only presented with online users available to participate on the platform. In a second non-limiting example, a user may make a "virtual reservation" within the platform for a future time when they are expected to be online. In this second non-limiting example, the virtual reservation may specify that the user intends to be online at a particular date and time, and other users may make requests or schedule learning exchanges based on the virtual reservation information. In a third non-limiting example, a user may use one or more communication methods, such as email or platform communication functions, to schedule an available time with another user.

The language learning platform may be configured according to embodiments to provide access to platform content and functions for free or for a monetary charge. A non-limiting example provides that learning content such as text-based learning exercises may be provided at no charge, while certain enhanced user functions, such as certain user matching functions, may require payment of a fee. According to embodiments, the platform may be configured to facilitate micro-transactions for specific user actions, such as enhanced matching, platform access, or advanced teaching services. As such, each user profile may additionally be associated with a platform user payment account or one or more external payment methods.

For example, registered users may transfer applicable funds into an associated platform user payment account handled through the language learning platform that may be used to pay for charged services. In the alternative, a registered user may provide third party payment information, such as credit card, PayPal®, or other third party payment services, bank, or mobile computing device payment information for paying for charged services. PayPal® is a registered trademark of PayPal, Inc. Embodiments provide that platform users may not be required to provide payment information or platform payment account funds in order to register and use free content; however, users may be required to provide such information or funds in order to access charged services.

Platform user profile information may be comprised of public and private elements. Embodiments provide that public elements may be generally accessible by other user community members, while private elements may be used by the platform when performing certain functions, but may not be generally accessible by other user community members, except in certain specified circumstances. Embodiments may be configured such that public information may provide certain characteristics about a particular user without allowing another user to identify the particular user.

According to embodiments, users may access platform community members through community browsing, community filtering, and enhanced search functions. Embodiments may be configured to provide only public information of users accessed through the community browsing, community filtering, or enhanced search function. Non-limiting examples of public information include user name, student or teacher preference, native language, language of interest, competency, topic, gender, age range, country, and city information. According to embodiments, information that is not categorized as public is private. As such, a user may perform a limited user search through the community filtering function based on certain search terms and the platform may return a list of users matching the search terms. For example, embodiments provide that a user may invoke the community filtering function using native language, language of interest, gender, age range, country, and city search terms and may be provided access to the public information of community members matching the search terms.

The language learning platform may be configured to connect users with common and complementary language and life interests according to embodiments. These connections serve, inter alia, to enhance user interaction with the platform and to generate an engaged user community motivated to learn. As described previously, users may access other community members through a community browsing function. When a user logs onto the platform, they may be presented with one or more interfaces presenting configurations of information and content. In addition, these one or more interfaces may present a listing of community users registered with the system, and who may be associated with other information, such as whether or not they are online. As such, a user may browse through this listing of users, for example, to locate a user of interest for participation in a learning exchange without having to perform a filter or search.

In addition, users may access other community members through a community filtering function. This function may be configured according to embodiments to present a user with one or more other platform users associated with one or more search terms. For example, a user may want to see all users who speak a particular language. In addition, the same user may want to access to all users who speak a particular language, but with a certain level of competency, and only users living in a specific country. As such, a user may find community members who speak German at an advanced level and are from Germany, as opposed to a non-German speaking country, using the community filtering function.

Figure 6:
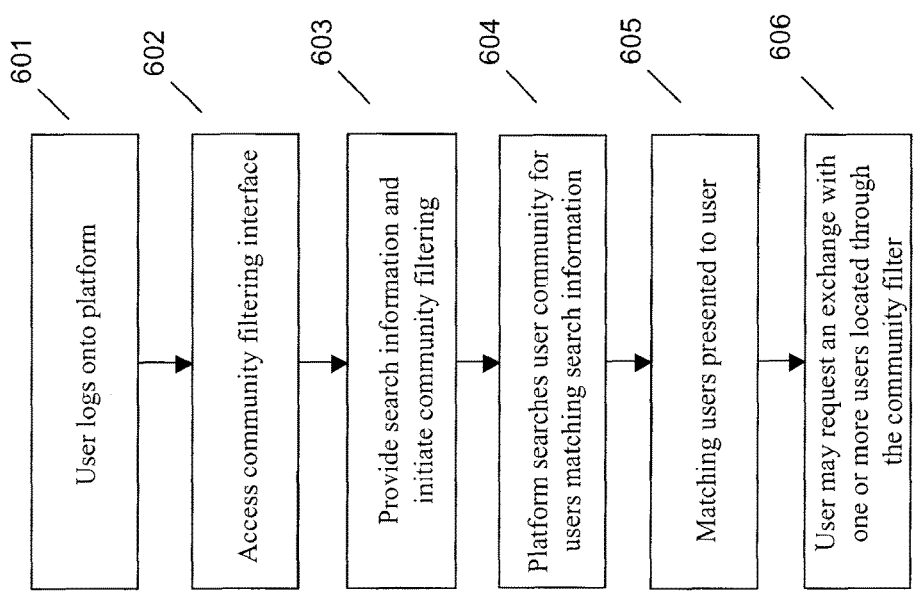

Referring to FIG. 6, therein is provided an example community filtering process configured according to an embodiment. A user logs onto the platform 601 and accesses a community filtering interface 602. The user provides certain search information and initiates the community filtering process 603, for example, through selection of a filter community icon. The platform searches community members that match one or more of the search terms 604 and presents the matching users to the first user 605 in a community filtering results interface, such as the interface illustrated in FIG. 7. The user may then request an exchange with one or more users located through the community filter function 606. Embodiments may be configured to rank and sort the filter results, for example, according to a search term weighting arrangement, availability, or by ranking located users according to how closely they matched the search terms.

Figure 8:
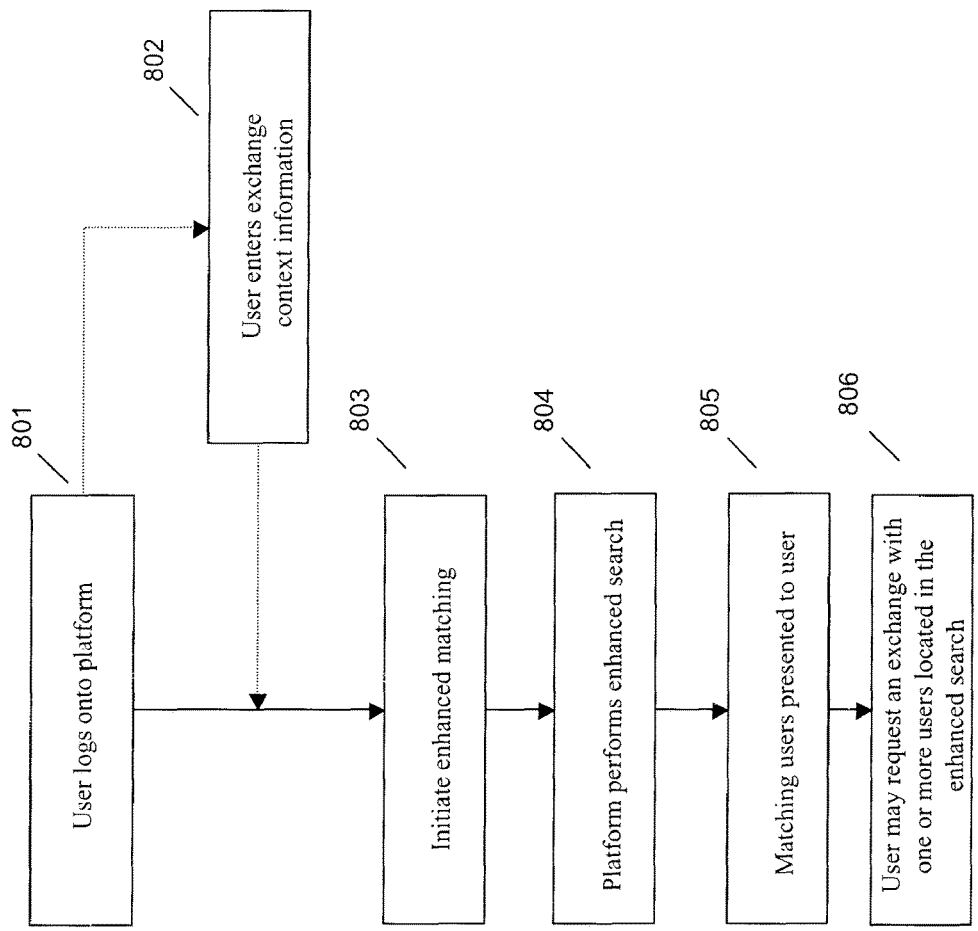
FIG. 8 provides an example enhanced matching process configured according to an embodiment.

The language learning platform provides an enhanced matching function configured to match platform users for one or more language learning exchanges. The enhanced matching function is configured according to embodiments to perform a user community search using more detailed information and more intricate matching processes, for example, as compared with the community filtering function. FIG. 8 provides an example enhanced matching process configured according to an embodiment. A user logs on to the platform 801 and initiates the enhanced matching process 803. The platform performs an enhanced search 804, matching user information, including detailed profile information and any other information extrapolated by the platform from the user profile information, with information associated with members of the platform user community. The platform provides an interface for the first user to access the enhanced search results 805, such as the interface provided in FIG. 7. The results may be ranked or sorted based on one or more criteria, including, but not limited to known languages and associated proficiencies, availability, language proficiency, and country. The user may then request an exchange with one of the users contained in the search results 806.

According to embodiments, the enhanced search results may provide a list of users located through the search. Each located user presented in the results may be associated with certain characteristics which may allow a user to decide whether or not they may want to participate in a learning exchange with a located user, but not enough characteristics as to allow a user to locate the users returned through the enhanced search results on their own, for example, through the community browsing or community filtering processes. For example, located users may be presented with information such as known languages and competencies, teaching and learning preferences, languages of interest, gender, age range, country, city, and online status.

An optional step in FIG. 8 provides that a user may enter exchange context information 802 before initiating the enhanced matching process 803. According to embodiments, the exchange context information operates to describe the desired context of the subsequent exchange, such as sources, topics, categories, exchange duration, date and time, and other information pertaining to the specific exchange. As such, a user who is using the exchange to practice Japanese for an upcoming business meeting in Japan may specify context information to ensure that the exchange is focused on language and cultural skills pertaining to Japanese business processes and etiquette, and that the user only has enough time to practice for one hour. Additional exchange content information includes, but is not limited to, native language, language of interest, preference for teaching or learning, competency level user intentions for language interest (e.g., business, travel), and topics of interest (e.g., language basics, travel lodging, restaurants).

Embodiments provide that the enhanced matching function is configured to match users with high complementarity with respect to user profile information and exchange context. The enhanced matching ensures that users participating in the learning exchange are engaged in the material and with each other, facilitating motivation for learning and interacting with the platform content, the user community, and the learning exchange.

Users may access platform community members through multiple processes, including community browsing, community filtering, enhanced matching, or other interfaces provided according to embodiments, such as an interface providing a congregation of users arranged according to certain characteristics, such as native language or interests. In addition, users may be categorized based on whether they are a teacher, student, or both. Embodiments provide that users may specify, through their profile information, exchange context information, or some combination thereof, whether they seek to learn, teach, or both.

For example, a first user may specify that they are a native English speaker willing to teach and are interested in learning French. A second user may specify that he is a native French speaker willing to teach and are interested in learning English. The platform is configured according to embodiments to provide processes for bringing the first user and the second user together in a mutually beneficial learning exchange, wherein the first user may teach English to and learn French from the second user, and the second user may teach French to and learn English from the first user. In addition, embodiments are configured to enhance the mutually beneficial exchange by aligning users according to further detailed profile information, resulting in a potentially more engaging exchange. As such, embodiments provide for matching users who are not only related in view of mutually beneficial native languages and languages of interest, but who are complimentary regarding other personal information, interests, and skill level which serves to enhance and strengthen the potential exchange relationship.

Embodiments provide that users may interact in one or more learning exchanges configured to facilitate language learning. For example, users may select user community members located through community browsing, community filtering, or enhanced matching and request a learning exchange. In response, users may view public profile information associated with a user requesting a learning exchange and may either accept or deny the request. According to embodiments, the learning exchanges may be comprised of language learning content, user communication interfaces, such as real time chat, peer-to-peer or peer-to-many video and audio. Voice over Internet Protocol (VoIP), file transfer, data exchange protocols, wiki-translate, and combinations thereof.

Figure 9:
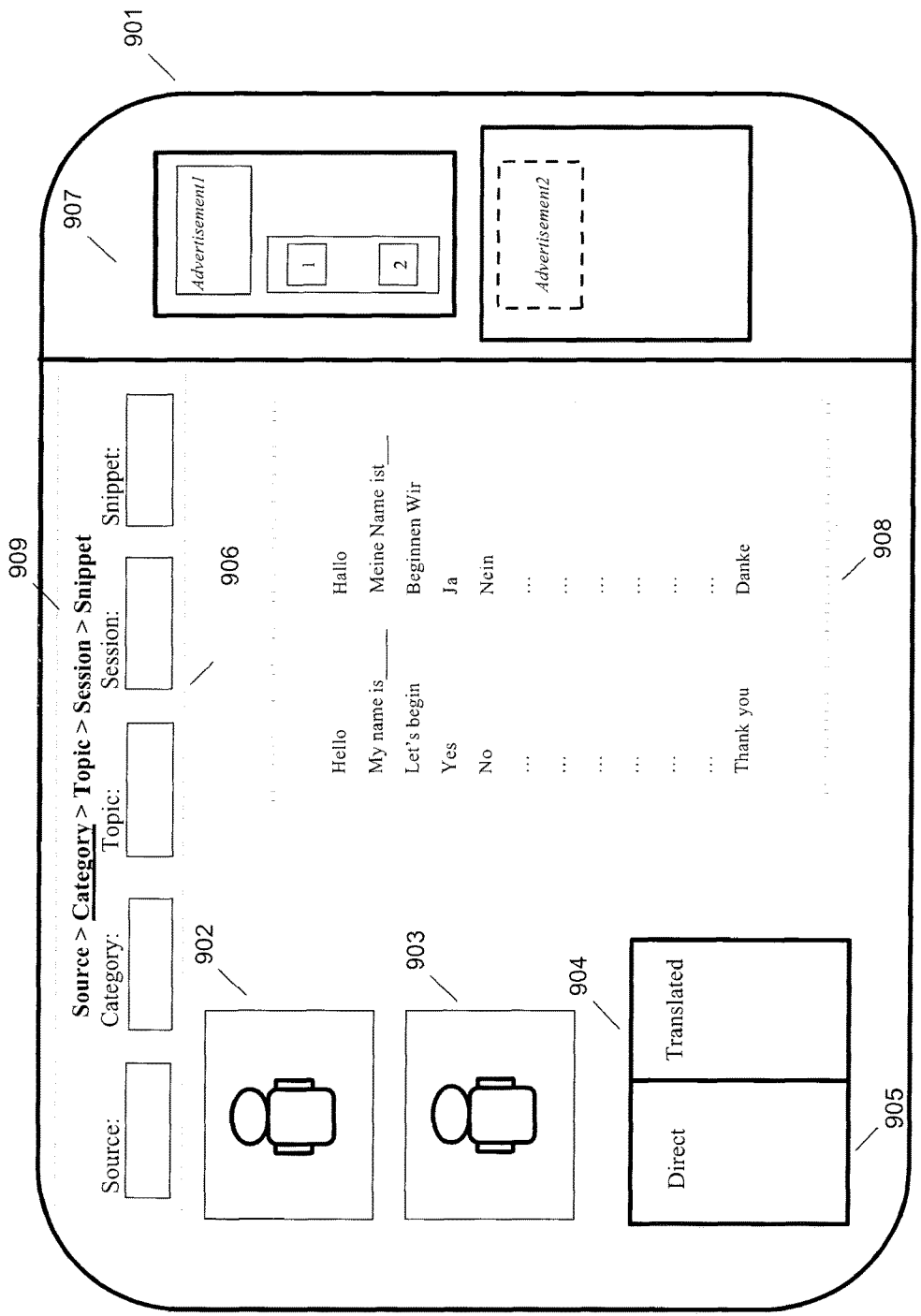
FIG. 9 provides an example exchange interface configured according to an embodiment.

Referring to FIG. 9, therein is provided an example learning exchange interface configured according to an embodiment. The learning exchange interface 901 is comprised of video stream interfaces 902, 903 for participating users as well as areas for text-based communication 904, 905. Text based communication 904, 905 may be real-time, and may be translated or direct (i.e., non-translated). In addition, as shown in the example of FIG. 9, text-based communication may be facilitated through multiple areas, such as an area of direct text 905 side-by-side with an area of text consisting of the translation 904 of the direct text. As such, the interface may be able to facilitate learning by showing a user the translation of any text they enter in a direct text area. The direct text 904 and translation 905 text-based communication areas may be selectively displayed, such that a user may simultaneously display both areas or just one area at a time. Exchange learning content 908 may also be provided for users to use as a teaching or learning tool.

A non-limiting example provides that the exchange learning content 908 may be comprised of one or more example dialogues provided in the languages of interest. In addition, one or more exchange context selection components 906 may be provided to alter exchange configurations, such as sources, categories, topics, and sessions. For example, the users may complete a beginning session involving greetings and introductions. As such, they may want to move to an advanced session involving personal interests, such as photography. Example dialogue content for different categories, topics, sessions, and snippets is provided in FIGS. 10-12. As shown in FIG. 9, one particular exchange context selection component 906 is a context indicator 909 displaying the current context of the learning exchange. In the example of FIG. 9, the users are working at the category level, which is highlighted. As such, users can see at which level they are working at and may interact accordingly or may change to a different level.

In addition, a section of the interface 907 may be designated to present contextual advertising and related information. According to embodiments, users participating in a learning exchange may be presented with differential advertising relevant to a user's particular profile or location. For example, two users located in different countries may be participating in an exchange involving the subject of soccer. As such, the users may be presented with advertisements related to soccer, such as a sporting goods store or ticket information, relevant to each user's respective location.

The language learning exchange may allow users to access content related to certain subject matter. In addition, embodiments may be configured to allow for user provided content that is made accessible to the platform user community. According to embodiments, users may upload information or platform content may be provided in a "wiki" configuration, or in any other form allowing for community creation, contribution, and editing of platform and exchange content. Similar to other wiki based interfaces, the platform may provide for a means of controlling, editing, and screening user content before distribution over the platform. For example, the platform may automatically screen user created content for certain phrases or terms, or one or more platform editors may examine user created content before publication. As such, embodiments may be configured to provide up-to-date and relevant language learning content that is driven by the interests of the platform user community. For example, users interested in music may be able to use content comprised of current musical interests, relevant music groups, and other related information.

According to embodiments, users may save user generated or created content associated with the platform and may access the content outside of the platform environment. An illustrative and non-restrictive example provides that a user may upload his own content for public or private use, for example, a video directed toward learning French basics, and may save the video in association with his profile. As such, when the user logs into the platform, they may have access to a selection for accessing content associated with their profile. The user generated content may be utilized as a source of continual improvement of platform materials, wherein users may update, correct, enhance, or improve upon platform content and user generated content. As such, platform content may be subject to improvement, modification, revisions and the like through one or more user-driven feedback loops or through crowdsourcing. These improvements and revisions may operate to improve the accuracy and relevancy of content available to platform.

In another illustrative and non-restrictive example, a user may save or designate content in a form accessible outside of the platform environment, including, but not limited to, through email (e.g., the content will be emailed by the platform to the associated email address), an application developed for a computing device, such as a mobile app for a mobile computing device, ftp site or other data sharing web site, or combinations thereof. As such, a user may access the platform content using an application executing on a computing device, such as a smartphone, tablet, or other suitable device, either through a browser or another application outside of the platform environment.

The platform provides content that is public and available to all community users. According to embodiments, users may also configure one or more private content areas comprised of content that is selectively accessible to users. Embodiments provide that user accounts may further be associated with one or more security elements that operate to allow access to a private content area. In an illustrative and non-restrictive example, a user account may be associated with an access key or password. In another illustrative and non-restrictive example, private content areas may be configured to accept certain access information, such as a user name, password, or both, for providing access to the private content area. In addition, access to private content areas may be contingent upon payment of a fee, such as a fee associated with platform enhanced access, which may be in addition to acceptance of access credentials.

A first non-limiting private content example provides that a user may generate their own content and provide fee-based access to the content, wherein community users receive a user name and password to access the content responsive to payment of the required fee. In a second non-limiting private content example, an enterprise may create one or more private content areas directed toward language skills pertinent to their particular industry. The enterprise may supply a user name and password to employees for accessing their private content pages, essentially creating a private employee Intranet consisting of private platform content. In a third non-limiting private content example, a school may create one or more private content pages approved by teachers or school administrators for use by students associated with the school. A fourth non-limiting private content example provides that a language tutor may use platform private content that she created as the learning materials for her students.

As previously described, platform users may be associated with a profile comprising multiple profile elements that they have configured themselves. Embodiments further provide for a user score profile element directed toward rating or scoring one or more user aspects on a particular scale, for example, on a scale of one to ten or on a percentage scale. A certain embodiment provides for a teaching score, wherein users who have interacted with a particular user may rate the teaching effectiveness of a particular user. Another embodiment provides for one or more scores formulated by the platform to provide indications of, inter alia, user ability, interaction effectiveness, or amiability. Such scores may be formulated based on the number of user community connections, for example, as a measure of user popularity, or the number of platform user interactions and repeat interactions, which may serve as an indicator of user interaction effectiveness, amiability, and the like. A further embodiment provides for a score associated with a user that represents an overall score and which may be specified by users who have interacted with a particular user, such as through a learning exchange. User scores may be used by other users when selecting partners for platform interaction. As such, they may be utilized in community filtering and enhanced matching functions, for example, wherein a user may specify that they only want to locate users with a score above a certain threshold. Embodiments provide for one or more individual scores, a combined score based on multiple scores associated with a user, or a combination thereof.

Figure 13:
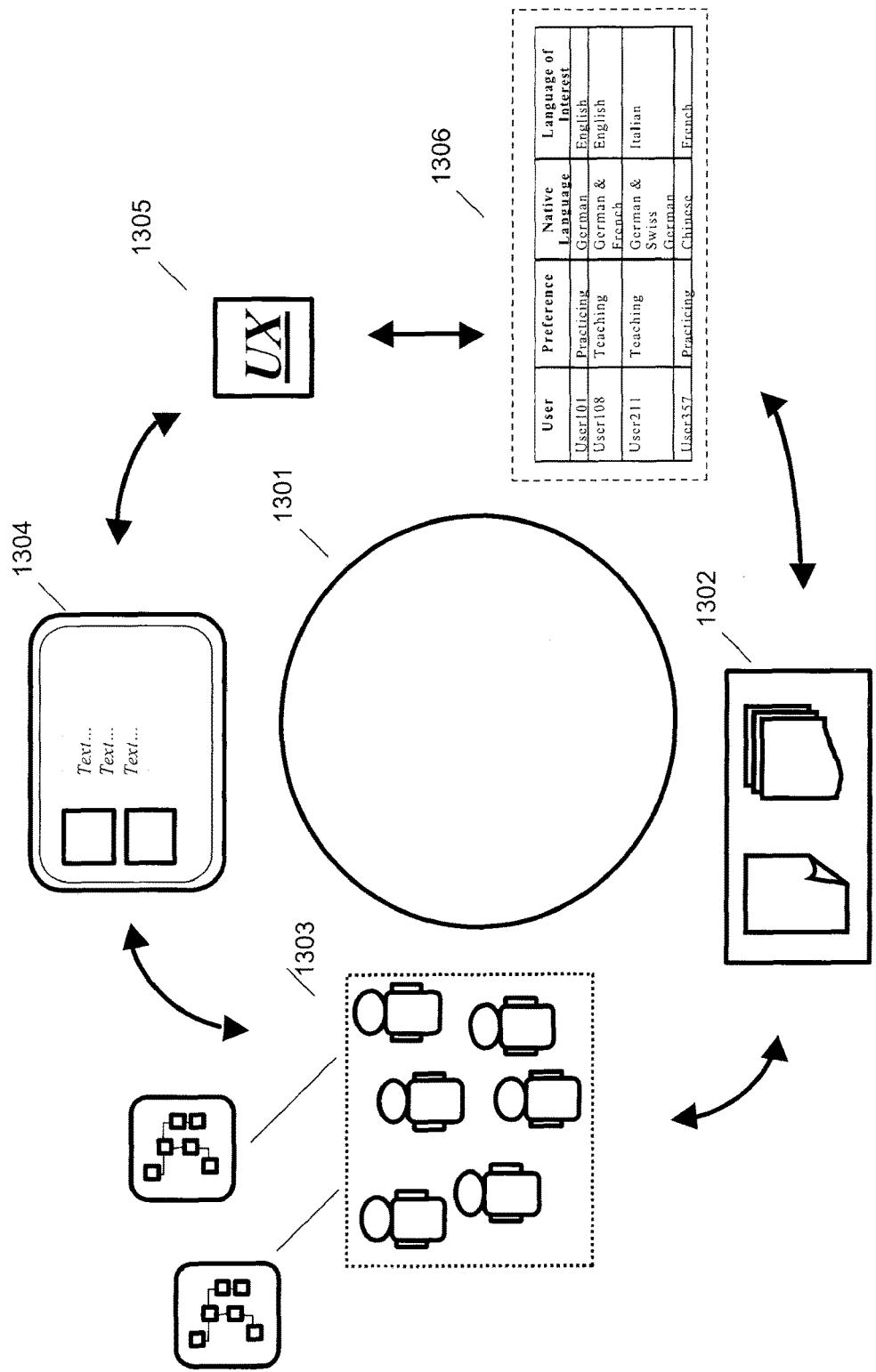
FIG. 13 provides an example language learning platform configured according to an embodiment.

Referring to FIG. 13, therein is provided an example language learning platform configured according to an embodiment. The language learning platform 1301 may be comprised of content 1302 directed toward providing language learning material. The content 1302 may be accessed by the platform user community 1303, which embodiments may configure as a platform social network or social graph. The user community 1303 may additionally be in communication with external social networks, such as Facebook® and LinkedIn®. LinkedIn® is a registered trademark of the LinkedIn Corporation. For example, users may register with the platform using credentials from an external social network or they may additionally elect to connect to user community members using one or more social networks. The user community 1303 may add to or modify the platform content 1302, for example, by uploading new content or editing platform content, such as wiki-based content. User community members may communicate 1304 using one or more communication interfaces, including peer-to-peer video, real time chat, or third party applications, such as Skype®. Skype® is a registered trademark of Skype Limited. The platform 101 may be associated with User Experience (UX) concepts 305 pertaining to the experience of users using the platform, for example, through implementation or association with one or more UX standards. Embodiments may be configured to match users 1306, for example, for language learning exchanges. Matching 1306 may be facilitated through high level community browsing or community filtering, or through a more accurate and intricate enhanced matching process.

Figure 14:
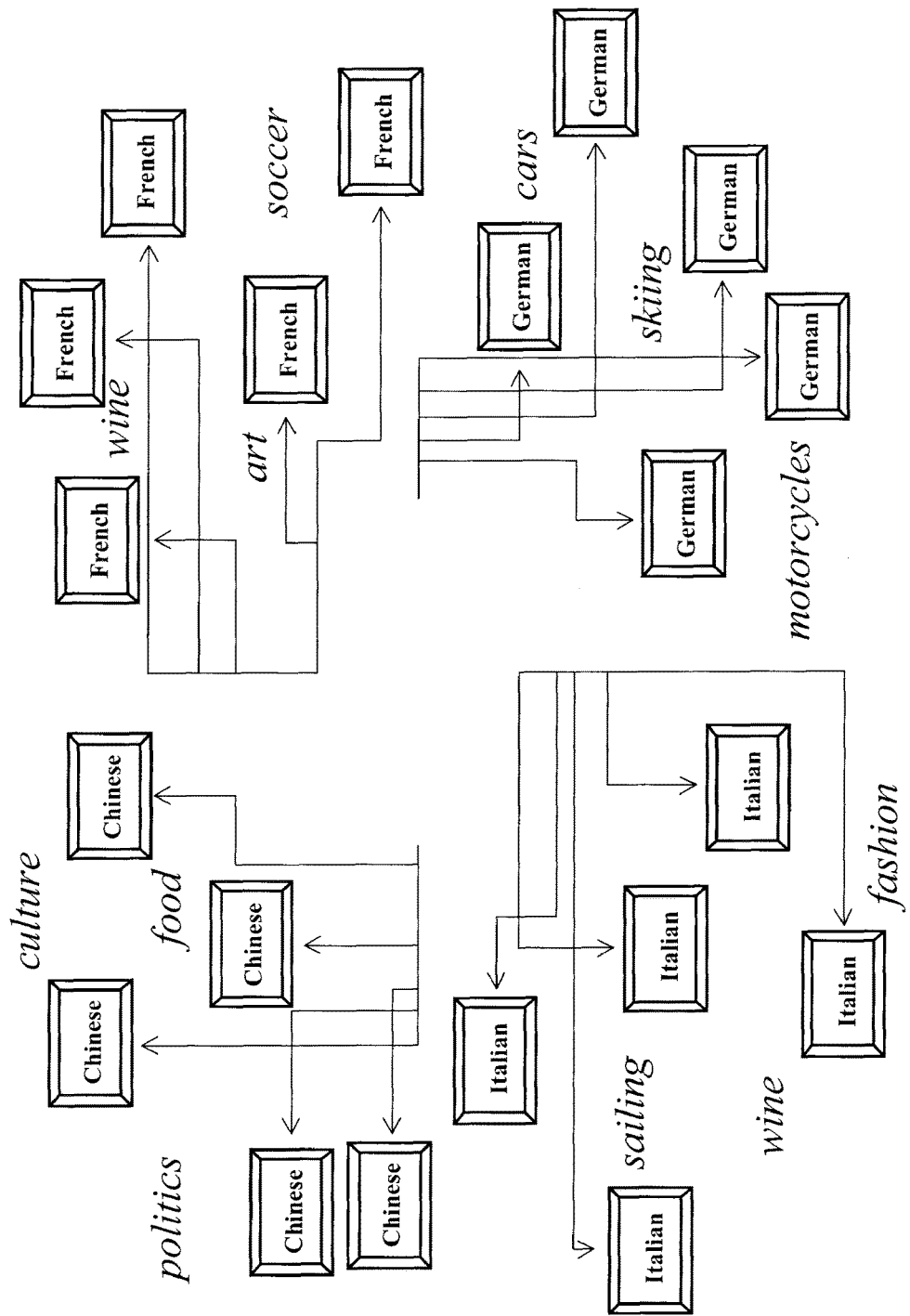
FIG. 14 provides an example depiction of the user community network according to an embodiment.

In FIG. 14, therein is provided an example depiction of the user community network according to an embodiment. As shown in FIG. 14, the user community may be arranged in one or more graphs according to language, such as by native language. In addition, each graph may be further arranged according to additional profile information, including, but not limited to, interests and sub-interests. As such, the user community may be expressed through connections and branches configured according to user characteristics. Embodiments provide that users may access the user community social graph at various levels. For example, a user seeking to learn French may be presented with the section of the graph that includes all French speakers, or even narrower sections involving all French speakers living in France that are females between the ages of twenty and thirty. This level of user community access may be provided by the platform without a fee, such as through community browsing or filtering functions. An enhanced search may also be available to locate community members that present a more meaningful compliment to a particular user, providing access to community members who may facilitate increased user engagement, motivation, and an enhanced social experience.

Figure 15:
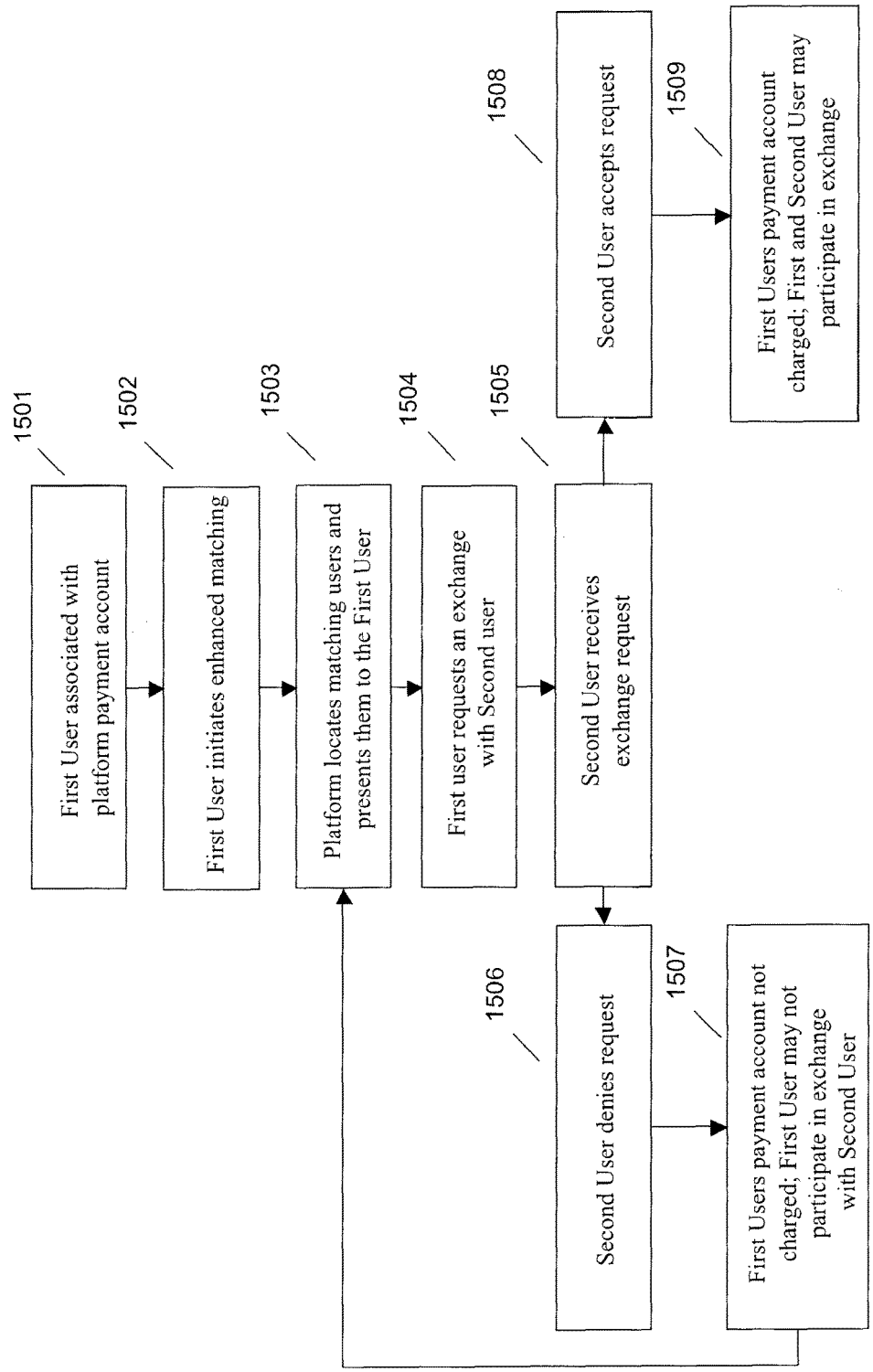
FIG. 15 provides an example process for accepting funds for platform charged services according to an embodiment

An example process for accepting funds for platform charged services according to an embodiment is provided in FIG. 15. The example charged service is participating in a learning exchange with a user located through the enhanced matching process. In FIG. 15, a First User is associated with a platform payment account 1501 having, for example, a balance of ten United States dollars. The First User initiates the enhanced matching process 1502 configured according to embodiments provided herein and is presented with a list of five matching platform users 1503. The First User may select one of the matching users, the Second User in this example, and request a learning exchange 1504. The Second User receives the exchange request 1505 and may view profile information, for example, public profile information, associated with the First User for determining whether or not to accept the exchange request. The Second User may then accept or deny the request 1506, 1508.

If the Second User accepts the request 1506, the First User's platform payment account may be charged a specified amount, such as one United States dollar, and the First User and Second User may participate in an exchange 1507. Alternatively, if the Second User denies the request 1508, the First User's platform payment account may not be charged, because an exchange did not occur, and the First User may not participate in an exchange with the Second User. The First User may then access the list of users returned from the search 503 to select another potential learning exchange partner. Embodiments may be configured to provide additional charged services, including, but not limited to, accessing platform content, facilitating paid teaching exchanges, enhanced matching services, enhanced platform access, and combinations thereof.

Platform content may be arranged in a taxonomy configured according to embodiments. Illustrative and non-restrictive content taxonomy levels include source, category, topic, session, and snippet. Embodiments provide that each level may have a corresponding amount of content configured according to exchange participant expectations regarding the duration of each interaction. According to embodiments, categories may be established when both users and content reach a critical mass requiring organization of content at a more general level. Example categories include, but are not limited to, personal interests, business and teaching, and learning and practicing.

Topics may be arranged as sub-categories, such as "language basics." which provide another level of content to guide teachers, learners, and practitioners based on more specific interests. According to embodiments, topic content may be organized in a manner that sets an expectation of duration, such as approximately one hour of language learning, teaching, or practicing per topic. Embodiments provide that sessions may be arranged as sub-topics and are another level of the chosen topic that sets a lesser-expected duration, such as a duration between thirty minutes and one hour. "Greetings and introductions" is a non-limiting example of a session. Snippets may be configured according to embodiments as a sub-session, with an expected duration less than that of a session, such as a duration between fifteen and thirty minutes. An illustrative and non-restrictive example of a snippet is "greetings." Each expected duration may be provided merely to give users a general timeframe for planning purposes. When users are active in a language learning exchange, they may participate as long as they want and may even reconnect their relationship without further involvement with the platform, such as through the user community social network, external social networks, information exchange systems, or some combination thereof.

In certain embodiments, the platform presents the user community in a level of the exchange wherein users are sorted according to one or more user characteristics, including whether or not the user is currently online, native language, language of interest, whether the user is willing to teach, learn, or practice, country, age range, or some combination of these and other user profile information elements. According to embodiment, users may additionally be represented in this level of the exchange as either online and available immediately or as offline, with or without indicators describing when the user may become online again. In addition, users may be represented virtually, for example, through a digital image, avatar, or other visual indicator. Embodiments provide for additional visual indicators specifying online/offline status, native language, teacher/student status, or information regarding whether a user is scheduled to be available but is not logged into the system. Users may have the opportunity to send a message or notification of interest to engage in a language exchange with user community members, including users that are available but offline.

The detailed description now turns to use case scenarios that may be performed according to embodiments provided herein. A first use case scenario involves a language learning exchange involving a teacher and a learner. Claudine is a nineteen-year-old native of The Netherlands and speaks fluent Dutch, French, German, and English as a result of her language studies in school. She is a registered member of the language learning platform and her profile indicates that she is interested in travel, music, reading, and movies. She is available to teach and practice any of the languages where she is fluent. Claudine is planning to travel to Switzerland for seasonal work in a ski resort in Zermatt that caters to an international clientele. Maria is a twenty-eight-year-old native of Germany that will be traveling frequently to Amsterdam for her work as a business consultant. Maria speaks German, French, and English and is interested in learning Dutch.

Claudine speaks primarily Dutch and wants to practice German and English. She appears in the learning exchange as a teacher for Dutch. French, German, and English and also appears as a learner for German and English. Maria speaks German and English and wants to learn Dutch. She appears in the language learning exchange as a teacher of German and wants to learn Dutch. Both Claudine and Maria are in the same time zone and are logged onto the platform. Maria requests to meet Claudine online for a mutual practice of their respective, and complementary, language interests.

A second use case scenario involves paid language services provided by a teacher. Fu-Chieh is a twenty-three-year-old graduate student of Taipei University in economics. His native language is Mandarin (Taiwanese) and he is able to speak English, but has never traveled outside of Taiwan. He has secured an entry-level job with the Taiwan embassy in the United States and will be relocating to Washington, D.C. in six months. He wants to work with a teacher that will help him improve his English skills. John is a twenty-nine-year-old engineer from San Francisco working in the semi-conductor industry. His job requires frequent travel to Taiwan to meet with foundry partners. He is at a disadvantage when the partners speak to each other in Mandarin. John is registered on the language learning platform site as a native English speaker who is able to teach and practice and is interested in someone who can help him learn basic Mandarin.

Fu-Chieh registers at the language learning platform and provides detailed profile information regarding his interests in bicycling, hiking, tennis, and baseball. John is registered and his detailed profile information includes interests in surfing, music, tennis, and bicycling. John places himself in the learning exchange virtually. Fu-Chieh goes to the learning exchange and sees over nine hundred people that speak English and are available to teach. He initiates the enhanced matching function and is provide with a list of five user community members that most closely match his profile information. From the list of five, Fu-Chieh selects John who is logged onto the system and available for a learning exchange. Once John agrees to Fu-Chieh's request, Fu-Chieh will be charged for the match according to embodiments described herein. Together they proceed to an online language learning exchange driven by Fu-Chieh's topical interest of "Business Basics."

A third use case scenario involves Jessica, who is a twenty-year-old university student preparing for a semester abroad in Italy. Jessica does not speak Italian, but is interested in picking up on the basics in order to ease her transition to a new country when she begins her semester abroad. Jessica is registered on the platform and her profile indicates she is interested in friendship and likes fashion, travel, and nightlife. Jessica is interested in finding a language partner that will assist her in learning Italian "Language Basics." Jessica enters the learning exchange and is presented with nearly four hundred people that are native Italians, or are able to teach Italian, and are also familiar with English. Jessica scrolls through the pages of users until she finds Alessandro, who is a twenty-four-year-old male living in Florence and is in graduate school studying for his Ph.D. in engineering. Alessandro's profile indicates he speaks Italian (native), French, and English. In addition, Alessandro is also preparing for a job in the U.K. after completion of his degree and is interested in practicing English. Detailed profile for Alessandro indicates that he likes travel, wine, and nightlife. Alessandro happens to be online in the learning exchange and agrees to a brief fifteen-minute snippet on "Greetings" in Italian. Alessandro and Jessica continue to participate in future learning exchanges and connect with each other through third party social network sites.

A fourth use case scenario involves a match of two practitioners performed through a platform paid service. Jean-Michel is a forty-year-old male business executive living in Paris who is preparing to take a vacation to the United States and wants to practice his English before his arrival. Jean-Michel's platform profile indicates that he likes to travel, ski, and cook. David is a thirty-five-year-old male doctor living in Denver who plans to visit Paris with his wife and children in the near future. David's profile indicates he likes photography, cooking, hiking, and skiing. Jean-Michel and David have similar interests in cooking and skiing.

David puts himself into the exchange virtually using the scheduler, because he does not have a sense of urgency for his French language learning. He remains in the exchange virtually and is able to receive notifications from users interested in a learning exchange. David is one of a certain number of people that are listed in the results of an enhanced match request initiated by Jean-Michel when looking for a language partner that speaks English. At the moment David agrees to an online exchange covering a topic and/or session and/or snippet, Jean-Michel will be agreeing to a payment for the match service. Jean-Michel and David proceed to an online learning exchange where Jean-Michel chooses the initial content driving the exchange, which, in this use case scenario, the topic is "Travel" and the session is "Ordering in a Restaurant." Together Jean-Michel and David spend approximately one half-hour working on "Ordering in a Restaurant." The exchange is mutually beneficial because while Jean-Michel is learning English. David may practice French at the same time that he is assisting Jean-Michel with his English skills.

Figure 16:
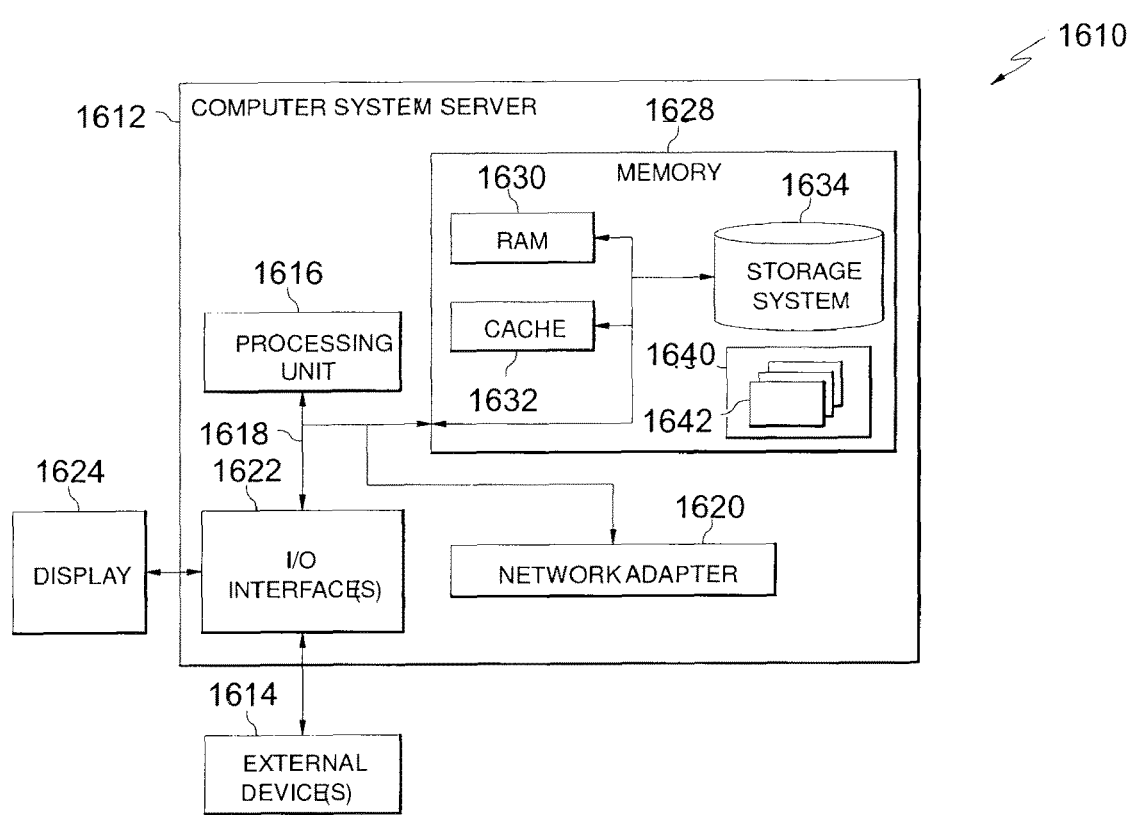
FIG. 16 illustrates an example circuitry of a computer system.

Referring to FIG. 16, it will be readily understood that certain embodiments can be implemented using any of a wide variety of devices or combinations of devices. An example device that may be used in implementing embodiments includes a computing device in the form of a computer 1610, which may take the form of a server, a workstation computer, a mobile device, a cloud computing node and the like. In this regard, the computer 1610 may execute program instructions configured perform certain functionalities of the embodiments, as described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-Demand Self-Service: a cloud consumer can unilaterally provision computing capabilities, such as server time and network storage, as needed automatically without requiring human interaction with the service's provider.

Broad Network Access: capabilities are available over a network and accessed through standard mechanisms that promote use by heterogeneous thin or thick client platforms (e.g., mobile phones, laptops, and PDAs).

Resource Pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid Elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private Cloud: the cloud infrastructure is operated solely for an organization. It may be managed by the organization or a third party and may exist on-premises or off-premises.

Community Cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: the cloud infrastructure is made available to the general public or a large industry group and is owned by an organization selling cloud services.

Hybrid Cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring again to FIG. 16, a schematic of an example of a cloud computing node is shown. Cloud computing node 1610 is only one example of a suitable cloud computing node and is not intended to suggest any limitation as to the scope of use or functionality of embodiments of the invention described herein. Regardless, cloud computing node 1610 is capable of being implemented and/or performing any of the functionality set forth hereinabove.

Referring now to FIG. 16, a schematic of an example of a cloud computing node is shown. Cloud computing node 1610 is only one example of a suitable cloud computing node and is not intended to suggest any limitation as to the scope of use or functionality of embodiments of the invention described herein. Regardless, cloud computing node 1610 is capable of being implemented and/or performing any of the functionality set forth hereinabove.

In cloud computing node 1610 there is a computer system/server 1612, which is operational with numerous other general purpose or special purpose computing system environments or configurations. Examples of well-known computing systems, environments, and/or configurations that may be suitable for use with computer system/server 1612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like Computer system/server 1612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 1612 in cloud computing node 1610 is shown in the form of a general-purpose computing device. The components of computer system/server 1612 may include, but are not limited to, one or more processors or processing units 1616, a system memory 1628, and a bus 1618 that couples various system components including system memory 1628 to processor 1616.

Bus 1618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1612 typically includes a variety of computer system readable media. Such media may be any available media that is accessible by computer system/server 1612, and it includes both volatile and non-volatile media, removable and non-removable media.

System memory 1628 can include computer system readable media in the form of volatile memory, such as random access memory (RAM) 1630 and/or cache memory 1632. Computer system/server 1612 may further include other removable/non-removable, volatile/non-volatile computer system storage media. By way of example only, storage system 1634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM. DVD-ROM or other optical media can be provided. In such instances, each can be connected to bus 1618 by one or more data media interfaces. As will be further depicted and described below, memory 1628 may include at least one program product having a set (e.g., at least one) of program modules that are configured to carry out the functions of embodiments of the invention.

Program/utility 1640, having a set (at least one) of program modules 1642, may be stored in memory 1628 by way of example, and not limitation, as well as an operating system, one or more application programs, other program modules, and program data. Each of the operating system, one or more application programs, other program modules, and program data or some combination thereof, may include an implementation of a networking environment. Program modules 1642 generally carry out the functions and/or methodologies of embodiments of the invention as described herein.

Computer system/server 1612 may also communicate with one or more external devices 1614 such as a keyboard, a pointing device, a display 1624, etc.; one or more devices that enable a user to interact with computer system/server 1612; and/or any devices (e.g., network card, modem, etc.) that enable computer system/server 1612 to communicate with one or more other computing devices. Such communication can occur via Input/Output (I/O) interfaces 1622. Still yet, computer system/server 1612 can communicate with one or more networks such as a local area network (LAN), a general wide area network (WAN), and/or a public network (e.g., the Internet) via network adapter 1620. As depicted, network adapter 1620 communicates with the other components of computer system/server 1612 via bus 1618. It should be understood that although not shown, other hardware and/or software components could be used in conjunction with computer system/server 1612. Examples, include, but are not limited to: microcode, device drivers, redundant processing units, external disk drive arrays, RAID systems, tape drives, and data archival storage systems, etc.

Figure 17:
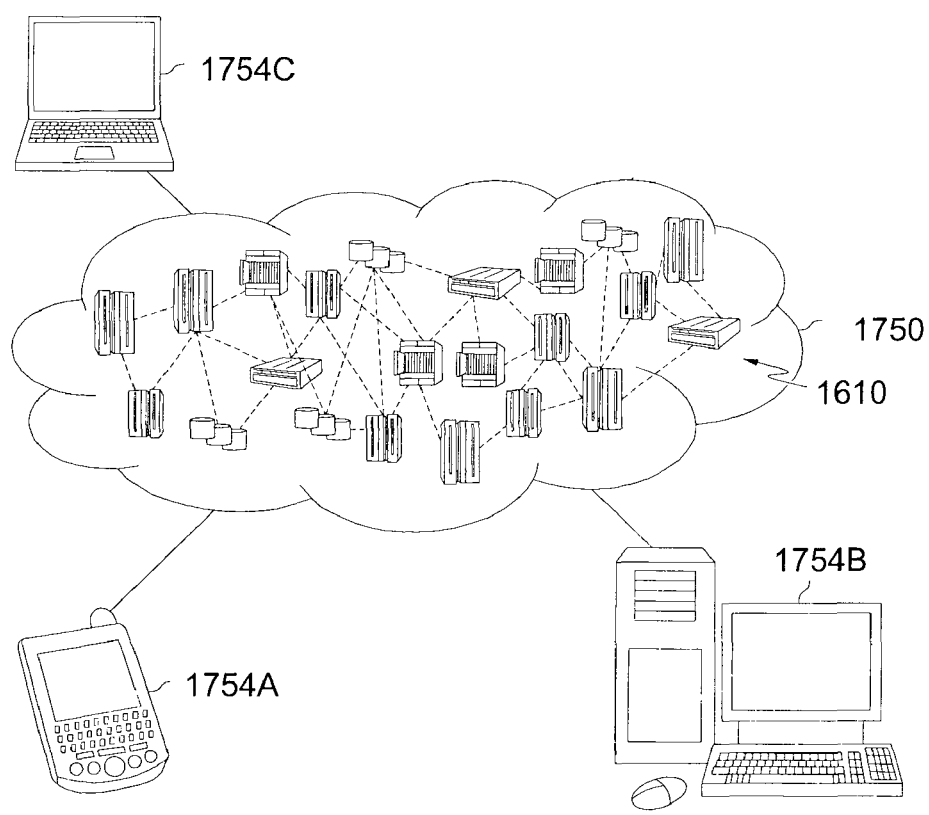
FIG. 17 illustrates an example cloud computing environment.

Referring now to FIG. 17, illustrative cloud computing environment 1750 is depicted. As shown, cloud computing environment 1750 comprises one or more cloud computing nodes 1610 with which local computing devices used by cloud consumers, such as, for example, personal digital assistant (PDA) or cellular telephone 1754A, desktop computer 1754B, and laptop computer 1754C may communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 1750 to offer infrastructure, platforms and/or software as services for which a cloud consumer does not need to maintain resources on a local computing device. It is understood that the types of computing devices 1754A-C shown in FIG. 17 are intended to be illustrative only and that computing nodes 10 and cloud computing environment 50 can communicate with any type of computerized device over any type of network and/or network addressable connection (e.g., using a web browser).

Figure 18:
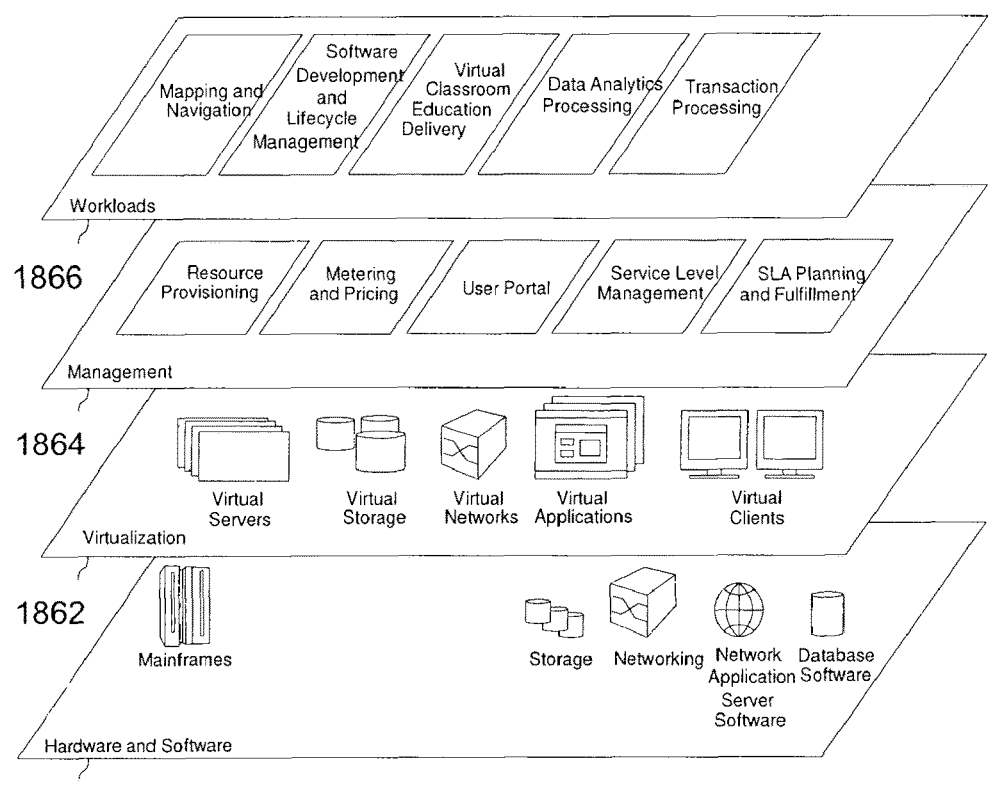
FIG. 18 illustrates another example cloud computing environment.

Referring now to FIG. 18, a set of functional abstraction layers provided by cloud computing environment 1750 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 1860 includes hardware and software components. Examples of hardware components include mainframes, storage devices; networks and networking components. An example of a software component includes network application server software.

Virtualization layer 1862 provides an abstraction layer from which the following examples of virtual entities may be provided: virtual servers; virtual storage; virtual networks, including virtual private networks; virtual applications and operating systems; and virtual clients.

In one example, management layer 1864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1866 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Those skilled in the art will recognize that aspects may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

The invention claimed is:

1. A system for enabling communication by complementary users of a language learning exchange, the system comprising:
at least one processor;
a computer readable storage medium containing programming instructions that are configured to instruct the at least one processor to:
identify a first user in a user community of a language learning platform,
identify, for the first user, associated profile information comprising a native language and a language of interest,
use the profile information to automatically identify a complementary user in the user community who has (i) a native language that matches the language of interest of the first user, and (ii) a language of interest that matches the native language of the first user,
cause a first local computing device of the first user and a second local computing device of the complementary user to each output a learning exchange interface through which the first user and the complementary user may communicate in the language learning exchange,
receive a source, a category, or a topic from the first user or the complementary user via a topic profile interface of that user's learning exchange interface,
retrieve, from a set of language learning content, content that corresponds to the received source, category or topic, and
present the retrieved content to the first user and the complementary user in either of the languages via the language learning interfaces.

2. The system of claim 1:
further comprising instructions configured to cause the at least one processor to receive, from the first user or the complementary user, user generated content;
wherein the instructions to retrieve the content that corresponds to the received source, category or topic comprise instructions to retrieve the user generated content.

3. The system of claim 1, further comprising instructions configured to cause the at least one processor to:
enable either of the users to add or edit platform content for the language learning exchange; and
enable the other user to access the platform content as a charged service.

4. The system of claim 1, further comprising instructions configured to cause the at least one processor to:
enable either of the users to configure a private content area comprising platform content generated by that user; and
enable the other user to access the platform content contingent on payment of a required fee.

5. The system of claim 1, wherein the instructions to cause the first local computing device of the first user and the second local computing device of the complementary user to each output the learning exchange interface through which the first user and the complementary user may communicate comprise instructions to cause the first local computing device and the second local computing device to:
output video stream interfaces in the learning exchange for each of the first user and the complementary user to participate in real-time communication via video; and
output areas in the learning exchange interface for text-based communication between the first user and the complementary user.

6. The system of claim 1, wherein the instructions that cause the at least one processor to identify the complementary user comprise instructions to comprise instructions to perform enhanced matching by:
receiving one or more search terms;
searching for complementary user community users having profile information matching the one or more search terms; and
presenting the complementary user community users identified by the searching as search results to the first user.

7. The system of claim 6, further comprising additional instructions that are configured to cause the at least one processor to enable the first user to send an exchange request to one or more complementary user community users contained within the search results.

8. The system of claim 6, further comprising additional instructions that are configured to cause the at least one processor to:
score each complementary user community users based on the complementary user community user's interaction effectiveness on the language learning platform; and
when presenting the first user with the search results, filter the search results so that they include only complementary user community users with scores above a threshold.

9. The system of claim 1, further comprising additional programming instructions that are configured to cause the at least one processor to:
identify a subject of an exchange between the first user and the complementary user via the learning exchange interfaces; and
cause the learning exchange interfaces to present the first user, the complementary user, or both with an advertisement relating to the identified subject.

10. The system of claim 1, further comprising additional programming instructions that are configured to cause the at least one processor to:
- identify a location of the first user and a location of the complementary user; and
- cause the learning exchange interfaces to present each of the first user and the complementary user with advertisements that are relevant to each user's respective location.

11. A method of enabling communication by complementary users of a language learning exchange, the method comprising:
- by at least one processor, executing programming instructions that cause the at least one processor to:
  - identify a first user in a user community of a language learning platform;
  - identify, for the first user, associated profile information comprising a native language and a language of interest;
  - use the profile information to automatically identify a complementary user in the user community who has (i) a native language that matches the language of interest of the first user, and (ii) a language of interest that matches the native language of the first user;
  - cause a first local computing device of the first user and a second local computing device of the complementary user to each output a learning exchange interface through which the first user and the complementary user may communicate in the language learning exchange;
  - receive a source, a category, or a topic from the first user or the complementary user via a topic profile interface of that user's learning exchange interface;
  - retrieve, from a set of language learning content, content that corresponds to the received source, category or topic; and
  - cause the language learning interfaces to present the retrieved content to the first user and the complementary user in either of the languages.

12. The method of claim 11:
- further comprising receiving, by the at least one processor from the first user or the complementary user, user generated content;
- wherein retrieving the content that corresponds to the received source, category or topic comprises retrieving the user generated content.

13. The method of claim 11, further comprising, by the at least one processor:
- enabling either of the users to add or edit platform content for the language learning exchange; and
- enabling the other user to access the platform content as a charged service.

14. The method of claim 11, further comprising, by the at least one processor:
- enabling either of the users to configure a private content area comprising platform content generated by that user; and
- enabling the other user to access the platform content contingent on payment of a required fee.

15. The method of claim 11, wherein causing the first local computing device of the first user and the second local computing device of the complementary user to each output the learning exchange interface through which the first user and the complementary user may communicate comprises:
- by the one or more processors, causing the first local computing device and the second local computing device to:
  - output video stream interfaces in the learning exchange for each of the first user and the complementary user to participate in real-time communication via video; and
  - output areas in the learning exchange interface for text-based communication between the first user and the complementary user.

16. The method of claim 11, wherein identifying the complementary user comprises performing enhanced matching by:
- receiving one or more search terms;
- searching for complementary user community users having profile information matching the one or more search terms; and
- presenting the complementary user community users identified by the searching as search results to the first user.

17. The method of claim 16, further comprising, by the at least one processor, enabling the first user to send an exchange request to one or more complementary user community users contained within the search results.

18. The method of claim 16, further comprising, by the at least one processor:
- scoring each complementary user community users based on the complementary user community user's interaction effectiveness on the language learning platform; and
- when presenting the first user with the search results, filtering the search results so that they include only complementary user community users with scores above a threshold.

19. The method of claim 11, further comprising, by the at least one processor:
- identifying a subject of an exchange between the first user and the complementary user via the learning exchange interfaces; and
- causing the learning exchange interfaces to present the first user, the complementary user, or both with an advertisement relating to the identified subject.

20. The method of claim 11, further comprising, by the at least one processor:
- identifying a location of the first user and a location of the complementary user; and
- causing the learning exchange interfaces to present each of the first user and the complementary user with advertisements that are relevant to each user's respective location.

* * * * *